(12) United States Patent
Sparenberg, Sr.

(10) Patent No.: US 9,434,515 B2
(45) Date of Patent: Sep. 6, 2016

(54) SIMPLE COVER FOR WINDSHIELD WIPER

(71) Applicant: James E. Sparenberg, Sr., Glen Burnie, MD (US)

(72) Inventor: James E. Sparenberg, Sr., Glen Burnie, MD (US)

( * ) Notice: Subject to any disclaimer, the term of this patent is extended or adjusted under 35 U.S.C. 154(b) by 0 days.

(21) Appl. No.: 13/912,420

(22) Filed: Jun. 7, 2013

(65) Prior Publication Data

US 2014/0000772 A1     Jan. 2, 2014

Related U.S. Application Data

(60) Provisional application No. 61/690,098, filed on Jun. 19, 2012.

(51) Int. Cl.
*B60S 1/04*     (2006.01)
*B65D 37/00*    (2006.01)
*B60J 11/06*    (2006.01)
*B60S 1/38*     (2006.01)

(52) U.S. Cl.
CPC ............... *B65D 37/00* (2013.01); *B60J 11/06* (2013.01); *B60S 1/0491* (2013.01); *B60S 2001/3843* (2013.01)

(58) Field of Classification Search
CPC .... B65D 81/3886; B65D 25/34; A61G 5/10; B62D 1/06; A61M 16/0497
USPC ............ 150/154, 159, 160; 15/320, 250.361, 15/250.001; 128/207.17; 135/17, 25.41, 135/34.2, 48; 206/315.4, 315.6; D12/220
See application file for complete search history.

(56) References Cited

U.S. PATENT DOCUMENTS

| | | | | |
|---|---|---|---|---|
| 3,160,906 | A | * 12/1964 | Morena | B60S 1/0408 15/250.352 |
| D228,044 | S | * 7/1973 | Hilden | 135/34.2 |
| 5,412,177 | A | 5/1995 | Clark | |
| 5,425,388 | A | * 6/1995 | Chen | A45B 25/28 135/34.2 |
| 5,564,157 | A | 10/1996 | Kushida et al. | |
| 6,070,287 | A | * 6/2000 | Kornegay | B60S 1/38 15/247 |
| 6,247,201 | B1 | 6/2001 | McCray | |
| 6,630,217 | B1 | * 10/2003 | Jaaskelainen, Jr. | B60P 7/04 180/308 |
| D586,716 | S | * 2/2009 | Radfar | D12/220 |
| 2006/0289011 | A1 | * 12/2006 | Helsel | A61M 25/02 128/207.17 |

* cited by examiner

*Primary Examiner* — Fenn Mathew
*Assistant Examiner* — Cynthia Collado
(74) *Attorney, Agent, or Firm* — Leveque Intellectual Property Law, P.C.

(57) ABSTRACT

The present provides a pair of foam tubes intended to be placed over windshield wipers. The Simple Cover's design provides consumers a way of protecting their windshield wipers from harsh weather and other environmental elements. The Simple Cover is comprised of a pair of durable, tube shaped protective covers intended to fit snugly over windshield wipers. In an embodiment, the foam cover further comprises a carrying handle.

5 Claims, 1 Drawing Sheet

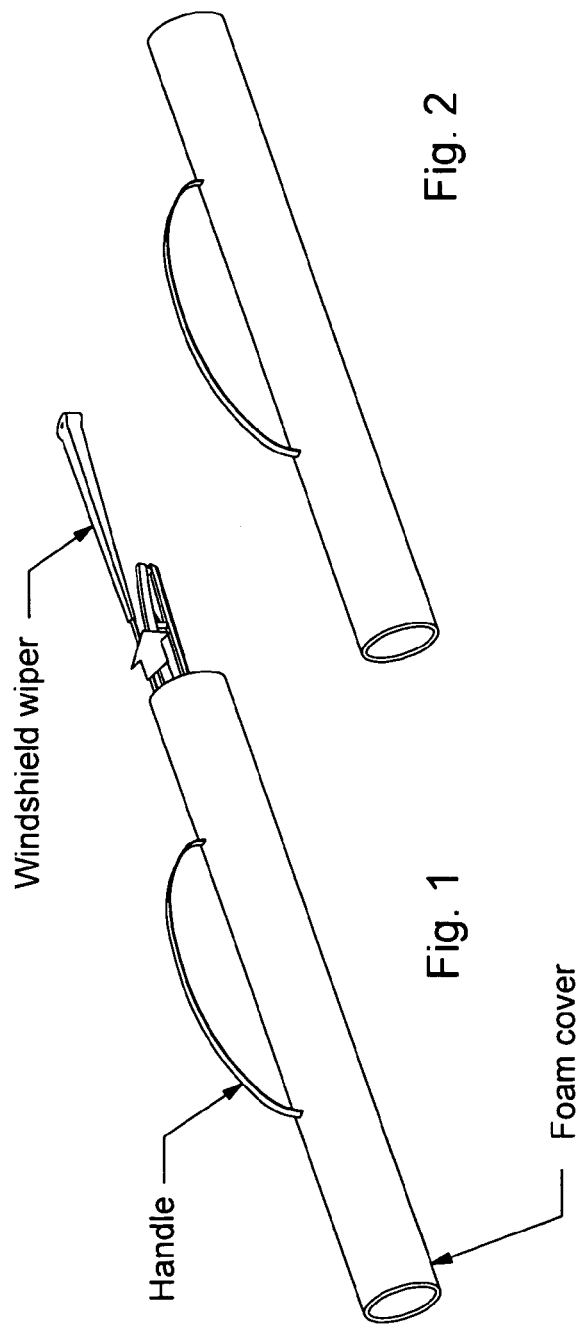
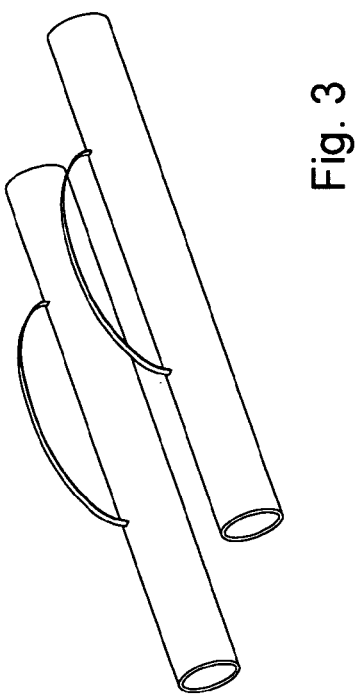

SIMPLE COVER FOR WINDSHIELD WIPER

CLAIM OF PRIORITY

This patent application claims priority under 35 USC 119 (e) (1) from U.S. Provisional Patent Application Ser. No. 61/690,098 filed Jun. 19, 2012, of common inventorship herewith entitled, "Simple Cover for Windshield Wiper."

FIELD OF THE INVENTION

The present invention pertains to the field of vehicular windshield aids, and more specifically to the field of windshield wiper accessories.

BACKGROUND OF THE INVENTION

The prior art has put forth several designs for windshield wiper accessories. Among these are:

U.S. Pat. No. 5,412,177 to Russell W. Clark describes an electrically heated cover for wiper blade assemblies which includes a cover body having front, rear, right hand, and left hand end walls and a top wall having a longitudinal access opening for allowing ready connection of the wiper blade assembly to a wiper arm. Electrical resistance heating elements are attached to the inner surface of the cover body and are electrically connected to the vehicle electrical system to provide heat that prevents formation of ice on the wiper blade assembly, the wiper blades and the windshield during severely cold snowy weather. The cover is held in place by a plurality of thumb or set screws through the cover that bear against the wiper blade assembly and are kept from slipping by rubber bushings that contact the wiper blade assembly. The cover is easily removed and installed and allows completely normal operation of the windshield wipers, and requires no alteration of preexisting equipment.

U.S. Pat. No. 5,564,157 to Tadao Kushida, Shuji Moro, Takashi Kuzuno, Yoshitaka Kaneko, Yuji Yagi, Chihiro Ueki and Akira Kadokura describes a vehicle wiper blade assembly which has a cover for covering blade support members, at different points therealong, and for covering portions of the wiper blade. A blade spoiler can be adjustably attached either to a primary lever, which connects the support members with the cover to a wiper arm, or to the wiper arm. The spoiler presses the wiper blade against the windshield when the vehicle is moving, improving the wiping efficiency. The lower edge of the spoiler is positioned nearer to the windshield than to the bottom of the cover to improve air and debris flow. The support members are also pivotally coupled to both ends of the primary lever to improve the wiper blade efficiency.

U.S. Pat. No. 6,247,201 to Nora McCray describes a rear wiper blade protective device including a cylindrical tube having an open first end and a closed second end. The open first end is dimensioned for receiving the rear wiper blade therein. A pair of suction cups is coupled with respect to the cylindrical tube whereby the suction cups can be adhered to the rear windshield with the rear wiper blade positioned within the cylindrical tube.

None of these prior art references describe the present invention.

SUMMARY OF THE INVENTION

It is the intent of the present invention to provide a pair of protective covers for windshield wipers.

BRIEF DESCRIPTION OF THE DRAWINGS

FIG. 1 illustrates a prototypical diagonal view showing a foam cover, a carrying handle, and a windshield wiper encased by the present invention.

FIG. 2 shows a covers of present invention with a carrying handle.

FIG. 3 is a close up diagonal view showing a pair of covers of the present invention with carrying handles.

DETAILED DESCRIPTION OF THE INVENTION

Owning a vehicle is much more than buying a car or truck and making monthly payments. Car ownership also involves making sure one's vehicle is in best condition at all times. Vehicle maintenance includes routine oil changes, light bulb replacements, tire changes, refilling coolant supply, and a variety of procedures that are either do it yourself tasks or more complex jobs that require the professional service Of a mechanic. Perhaps one of the most important parts of a vehicle that is checked consistently for functionality is the pair of windshield wipers. Windshield wipers literally wipe the windshields of any variety of vehicles including cars, trucks, SUVs, trains, aircraft and buses. While wipers are occasionally used to wipe away debris that sticks to the windshield, they are primarily used for wiping away rain water on moving vehicles, to ensure the driver has an unobstructed and clear view of the road during a storm or rain shower thereby decreasing the chance of collision and injury. Because windshield wipers are an essential safety tool, state laws require they are utilized during storms or showers. Drivers must keep their windshield wipers functional. After extended use, windshield wipers begin to lose their effectiveness and leave a slick and obstructive film of water behind them while noisily streaking across a windshield.

Over time The rubber wiping edge of the blades, will deteriorate from exposure to natural elements and from wiping foreign objects from the windshield, causing small nicks or cracks along the wiping edge, resulting in streaks on the windshield left along the wiper's path. This also contributes to reduced or blurred visibility.

The wiper blade is generally manufactured from an extruded rubber compound, susceptible to deterioration from extended exposure to natural sunlight. This ultraviolet exposure also contributes to reduced effectiveness and leads to more frequent replacements.

For effective windshield wipers, mechanics suggest changing your wipers every six to twelve months which is appropriate for residents in sunny areas with little rainfall and no snowfall. In areas with large amounts of inclement weather, a car owner must replace wipers more frequently. With snowstorms, heavy snowfall builds up on the windshield and rests on top of windshield wipers. When drivers clean snow off their car, they often find their windshield wipers are damaged and must purchase new windshield wipers. Some residents in snow prone areas leave their windshield wipers straight up to avoid damage, but if snowfall is great enough, windshield wipers still end up bent or broken completely in half.

The Simple Cover is an ideal accessory for owners of recreational vehicles, aircraft, or farm equipment that may sit idle for extended periods between uses. Use of the Simple Cover will help extend the useful life of wiper blades on these vehicles by protecting them from harsh environmental conditions like freezing/thawing cycles and ultraviolet deterioration.

The present invention, hereinafter referred to as the Simple Cover for Windshield Wipers, or Simple Cover, is a uniquely designed pair of foam tubes intended to be placed lengthwise over the windshield wipers. The Simple Cover's design provides consumers a way of protecting their windshield wipers from harsh weather and other environmental elements. The Simple Cover is comprised of a pair of durable, tube shaped protective covers intended to fit snugly over windshield wipers. Composed of either a durable weatherproof silicone or plastic with ultraviolet protection, the Simple Cover is comparable in size to standard vehicle windshield wipers. The diameter of the standard Simple Cover is approximately two to three inches. The length varies to accommodate small, midsize and luxury cars, SUVs, minivans and pickup trucks; virtually any vehicle equipped with windshield wipers. An available stock length is approximately thirty inches with perforations applied approximately every two inches for custom adaptability to a user's specific needs.

To use, consumers simply trim their Simple Cover tubes to the desired length and slide them over both windshield wipers prior to a snowstorm or windstorm. Once the storm has passed, users just as easily remove the Simple Cover from the wipers. The Simple Cover is available in black and various popular colors. The Simple Cover is available in various sizes for any vehicle equipped with windshield wipers including cars, trucks, SUVs, buses, trains, and aircraft. Consumers who use the Simple Cover save money by eliminating a need to replace windshield wipers as frequently during winter months. Rather than having to dig their windshield wipers out from under the snow, users simply wipe away any snow on the windshield and remove the Simple Cover to reveal their completely unharmed windshield wipers. The Simple Cover prevents windshield wipers from freezing to windshields, an occurrence that often causes damage to the wipers and blades. Easy to use, consumers effortlessly apply and remove the Simple Cover when necessary. Constructed of high quality and durable materials, the Simple Cover withstands years of repeated use with ease.

Although this invention has been described with respect to specific embodiments, also it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A protective cover for a windshield wiper, comprising:
a foam tube open at a distal end to receive a windshield wiper blade and arm, wherein a circumferential wall of the foam tube is closed and continuous and wherein the foam tube comprises weatherproof silicone foam or plastic foam with ultraviolet protection,
wherein the foam tube further comprises a plurality of perforations, the plurality of perforations forming a plurality of tear lines around the circumference of the foam tube to enable adjustment of a length of the protective cover.

2. The protective cover for a windshield wiper of claim 1, further comprising a carrying handle, wherein the handle is elongate and has two ends and the handle is centrally located on the foam tube and each end of the handle is mounted to the foam tube.

3. The protective cover for a windshield wiper of claim 1, wherein the cover is sized to accommodate the blade and arm of the windshield wiper.

4. The protective cover for a windshield wiper of claim 3, wherein a diameter of the cover is approximately two to three inches.

5. The protective cover for a windshield wiper of claim 1, wherein the plurality of tear lines are located at approximately two inch intervals along a length of the foam tube.

* * * * *